United States Patent
McMahon

(10) Patent No.: US 6,937,149 B2
(45) Date of Patent: Aug. 30, 2005

(54) HANDLEBAR MOUNTED REMOTE TRANSMITTER CONTROLLER UNIT FOR DOOR OPERATOR

(75) Inventor: Michael T. McMahon, Salem, OH (US)

(73) Assignee: Overhead Door Corporation, Farmers Branch, TX (US)

( * ) Notice: Subject to any disclaimer, the term of this patent is extended or adjusted under 35 U.S.C. 154(b) by 0 days.

(21) Appl. No.: 10/639,111

(22) Filed: Aug. 12, 2003

(65) Prior Publication Data

US 2005/0035856 A1 Feb. 17, 2005

(51) Int. Cl.[7] .................................................. G08B 1/08
(52) U.S. Cl. .................... 340/539.11; 340/5.7; 340/528
(58) Field of Search ............................. 340/539.11, 5.7, 340/5.71, 528, 545.1, 5.32; 292/2, 144

(56) References Cited

U.S. PATENT DOCUMENTS

| | | | |
|---|---|---|---|
| D415,734 S | 10/1999 | Pomales | D13/168 |
| 6,566,998 B1 * | 5/2003 | Facory | 340/425.5 |
| 6,588,297 B1 * | 7/2003 | Day et al. | 74/551.8 |
| 2002/0020249 A1 | 2/2002 | Darland et al. | 74/551.8 |
| 2003/0160704 A1 * | 8/2003 | Piper et al. | 340/825.72 |
| 2004/0117039 A1 * | 6/2004 | Hantke et al. | 700/17 |

* cited by examiner

Primary Examiner—Phung T. Nguyen
(74) Attorney, Agent, or Firm—Gardere Wynne Sewell LLP

(57) ABSTRACT

A garage door opener remote controller unit is mountable on the handlebar of a motorcycle or other handlebar steered vehicle and includes a radio frequency transmitter and a push button actuator for sending a door control signal. The controller unit includes a housing and opposed mounting parts for mounting the controller unit on a handlebar assembly. The controller unit is mounted on a handlebar assembly by screw type fasteners which secure the controller unit housing and mounting parts in assembly. At least one of the mounting parts may include a recess or channel for training vehicle control cables and electrical conductors therethrough and along the handlebar.

19 Claims, 2 Drawing Sheets

HANDLEBAR MOUNTED REMOTE TRANSMITTER CONTROLLER UNIT FOR DOOR OPERATOR

BACKGROUND

Remote control type controllers for garage door operators are ubiquitous for automotive applications. Typically, such controllers comprise radio frequency transmitter devices which are battery powered and are mountable in a suitable relatively compact housing which may be clipped to a sun visor or otherwise conveniently mounted within a driver's reach in a motor vehicle. However, there is a need also to provide a remote control type controller for use with other vehicles which may require access to a garage. For example, bicycles, motorcycles, and other handlebar steered or tiller steered vehicles may require access to a garage whose door is operated by a remotely controllable operator.

Conventional remote controllers using radio frequency transmitters are not easily adapted for use with handlebar or tiller steered vehicles. For example, a garage door controller designed for use with automobiles is inconvenient when one wishes to use such a controller unit while riding a motorcycle. For example, when leaving for a ride a conventional automotive remote transmitter or controller unit can be placed inside a jacket pocket. However, later in the day as the ambient temperature increases the jacket might be removed and placed in the motorcycle saddlebag. Now, when the rider returns to the garage he must stop first and retrieve the remote transmitter from his jacket within the saddlebag before being able to open the garage door. Alternate approaches are, of course, to temporarily secure a conventional automobile remote transmitter to a handlebar steered vehicle. However, such an arrangement may result in the transmitter being easily lost or stolen. Thus, there is a need for a remote control type controller or transmitter for garage doors for use with handlebar steered vehicles, such as motorcycles, bicycles, and all terrain vehicles, as well as other handlebar or tiller steered vehicles which may require access to a garage which is closed by a door having a remote controllable door operator. It is to these ends that the present invention has been developed.

SUMMARY OF THE INVENTION

The present invention provides a remote control radio frequency transmitter type controller unit for use with handlebar steered vehicles or tiller steered vehicles for remotely controlling the opening and closing of a garage door.

In accordance with one aspect of the present invention a remote control transmitter based controller unit is provided which is adapted to be attached as an accessory near other control switches or control devices on the handlebar of a vehicle such as a motorcycle, for example. The controller unit is preferably configured to include opposed mounting members whereby screw fasteners may conveniently engage the mounting members and clamp the controller unit to a handlebar adjacent a handgrip or adjacent other control devices or switches for convenient actuation by the vehicle rider or driver.

In accordance with another aspect of the present invention a controller unit for a garage door operator is provided which includes a channel or passageway to allow routing of existing wiring and cables associated with control of a handlebar steered vehicle. The remote control controller unit includes a casing having a push button style switch actuator for energizing a radio frequency (RF) transmitter. A battery housed within the casing serves to power the RF transmitter and a low battery indicator, such as a light emitting diode (LED), may be included in the transmitter circuitry to inform the controller user when a battery should be replaced.

Still further, a remote control type controller in accordance with the present invention may provide for integrating the transmitter into the vehicle main switch assembly such as typically found on motorcycles, for example.

Accordingly, the present invention provides a garage door operator controller that is adapted to be securely fastened to a vehicle handlebar in a manner similar to the fastening of a main switch assembly, for a motorcycle, for example, and in a manner such that it does not normally attract attention. The controller unit may be ruggedly constructed and mounted in a readily accessible location on a handlebar of a handlebar steered vehicle, such as a bicycle, motorcycle, or all terrain vehicle, for example.

In accordance with yet further aspects of the present invention, a garage door operator controller is provided which is particularly adapted for mounting on the handlebar of a handlebar steered vehicle, such as a motorcycle, in a manner similar to that of other handlebar mounted controls, cannot be easily removed without proper tools, does not attract attention, can be purchased as an accessory and, thus, is adapted for after-market manufacture and marketing. Still further, one embodiment of the invention provides for integrating the controller into a master switch assembly which includes other control functions for a motorcycle, for example.

Those skilled in the art will further appreciate the above-noted features and advantages of the invention together with other important aspects thereof. Upon reading the detailed description which follows in conjunction with the drawings.

DETAILED DESCRIPTION OF THE PREFERRED EMBODIMENTS

Figure 1:
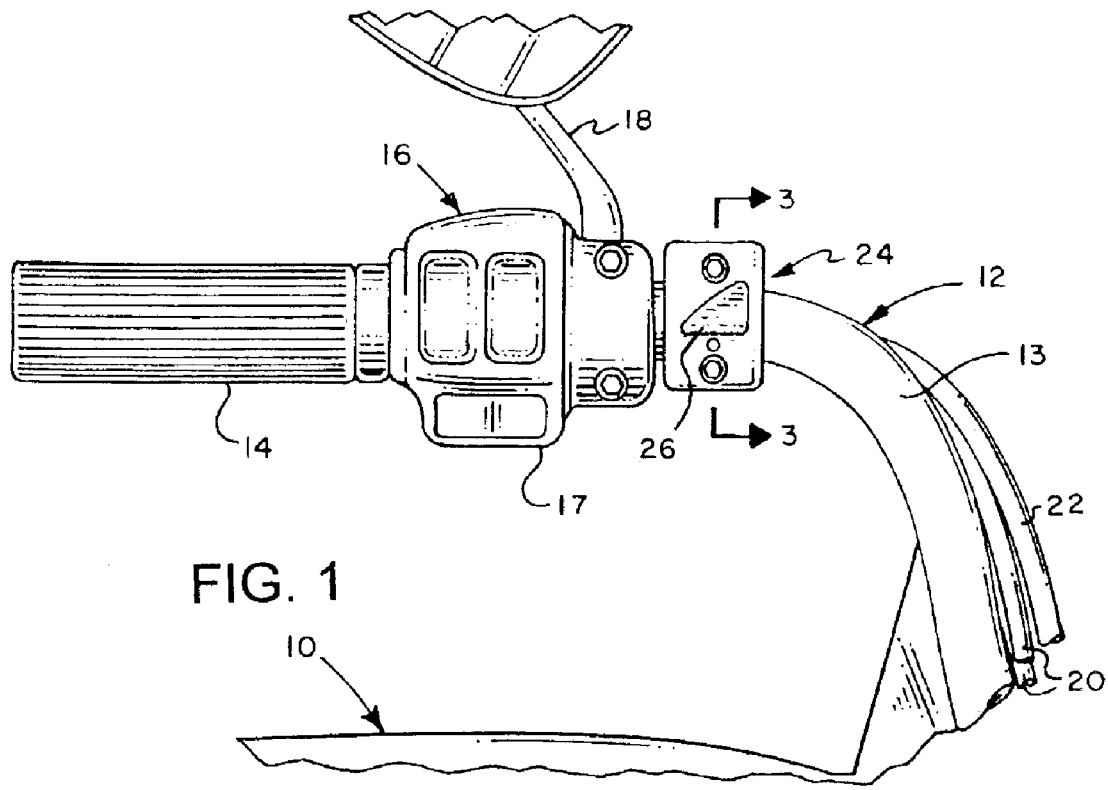
FIG. 1 is side elevation of a portion of a motorcycle handlebar showing the controller unit of the present invention mounted thereon.

In the description which follows like parts are marked throughout the specification and drawing with the same reference numerals, respectively. The drawing figures are not necessarily to scale and certain features may be shown exaggerated in scale or in somewhat generalized or schematic form in the interest of clarity and conciseness.

Referring to FIG. 1, there is illustrated a portion of a handlebar steered vehicle, such as a motorcycle 10 having a conventional handlebar assembly, a portion of which is illustrated and generally designated by the numeral 12. The handlebar assembly 12 includes a distal handgrip 14 which may comprise a throttle, brake or shift control mechanism, not shown, in accordance with conventional motorcycle design. A multi-function switch assembly 16 is mounted on the handlebar assembly 12 in a conventional position and may include switches for such functions as engaging an engine starter, a horn, vehicle running lights and turn signals, for example. The switch assembly 16 may also support a rearview mirror 18, as illustrated. Conventional electrical conductors 20 extend from the switch assembly 16 and are trained along the contour of the handlebar assembly 12 together with a throttle, brake or shift cable assembly 22.

FIG. 1 also illustrates a garage door operator remote controller unit in accordance with the invention and generally designated by the numeral 24. The controller unit 24 is conveniently mountable on the handlebar assembly 12 at a point adjacent to the switch assembly 16 and toward the distal end of the handlebar assembly with respect to a curved portion 13 thereof, as shown in FIG. 1. The controller unit 24 includes a so-called push button switch actuator 26 conveniently positioned for activation by a person riding the vehicle 10 and the activation of which sends a radio frequency signal to a garage door operator in a well known manner. The controller unit 24 may, for example, include circuitry and have the capability of transmitting a coded radio signal in accordance with the teaching of U.S. Pat. No. 6,049,289 issued Apr. 11, 2000 to Dennis Waggamon et al, which patent is incorporated herein by reference.

Figure 2:
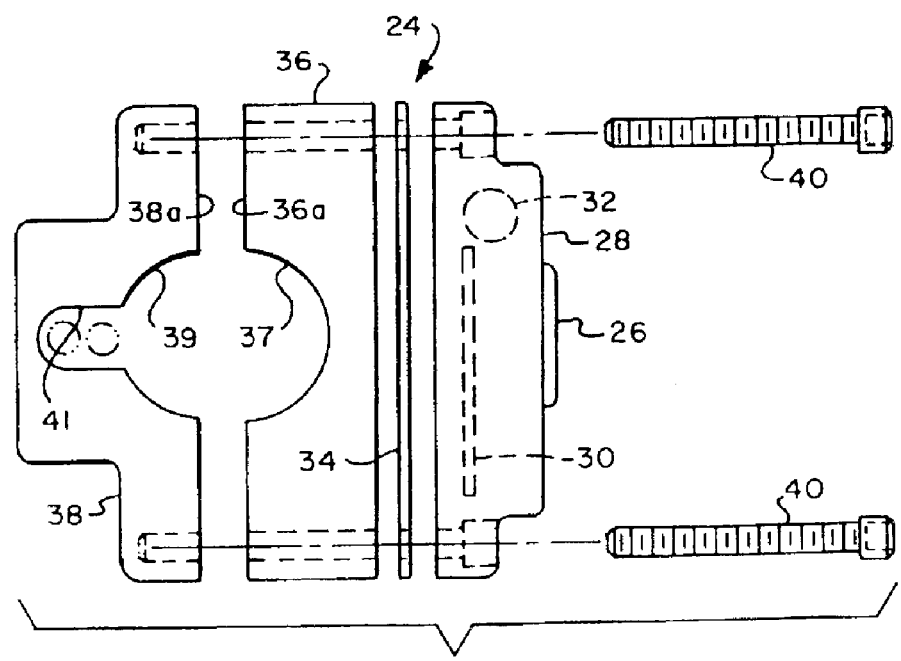
FIG. 2 is an exploded side elevation of the controller unit shown in FIG. 1.

Referring to FIG. 2 also, the controller unit 24 includes a first housing part 28 which supports the push button switch actuator 26 together with a suitable circuit board 30 and a source of electrical power, such as a low voltage battery 32, all mounted within the housing part 28. The circuit board 30 preferably includes electrical circuitry corresponding to that described in U.S. Pat. No. 6,049,289 for the transmitter disclosed in the patent. The controller unit 24 includes a generally planar base member or second housing part 34 interposed the housing part 28 and a mounting part 36 which is cooperable with a second mounting part 38 for mounting the controller unit 24 on the handlebar assembly 12. For example, the housing mounting parts 36 and 38 are provided with cooperating arcuate recesses 37 and 39 having diameters slightly greater than the diameter of the tubular handlebar assembly 12 and dimensioned such that conventional machines screws 40, FIG. 2, may be used to assemble the housing part 28 to the mounting part 36 and to the mounting part 38 to suitably clamp the controller unit 24 to the handlebar assembly. As shown in FIG. 2, the mounting part 38 has a second recess 41 form therein for receipt of members such as electrical conductors and cable assemblies, such as the conductors 20 and the cable assembly 22, extending through the recess and to aid in supporting and training these members along the contour of the handlebar assembly 12.

Figure 3:
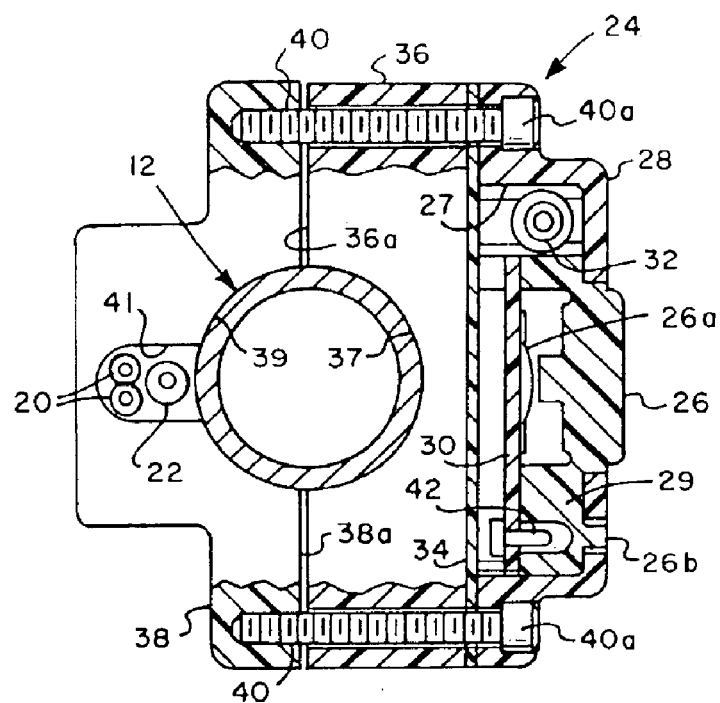
FIG. 3 is a view, partially sectioned, of the controller unit showing certain details of the components of the unit.

Referring now to FIG. 3, the controller unit 24 is shown assembled and clamped on the handlebar assembly 12. The mounting parts 36 and 38 are dimensioned such that surfaces defining the recesses 37 and 39 will engage the outer circumference of the handlebar assembly 12 before opposed surfaces 36a and 38a engage each other whereby a suitable clamping action may be provided. The machine screws 40 extend through suitable bores in housing parts 28 and 34, mounting part 36 and are threadedly engaged in suitable threaded bores formed in the mounting part 38, as shown. The screws 40 are preferably provided with suitable heads 40a which are recessed within counterbores formed in housing part 28 as illustrated in FIG. 3. Moreover, the screw heads 40a may include suitable wrench engaging recesses, not shown, which may be of the so-called hex socket type, clutch head, Frearson, Torx, or other specialized driving heads which minimize the risk of theft of the controller unit 24 when mounted on a handlebar steered vehicle, such as the motorcycle 10.

Referring further to FIG. 3, the housing part 28 is provided with a suitable cavity 27 for containment of the circuit board 30 and battery 32. The push button actuator 26 may be part of a padlike member 29 which is preferably formed of a flexible plastic to allow tactile distortion of the push button actuator to engage a switch 26a mounted on the circuit board 30, as illustrated. A light emitting diode low battery power indicator 42 may be mounted, as shown, on the circuit board 30 for projecting light through a lens part 26b to indicate when energy remaining in battery 32 is sufficient and the battery should be replaced. For example, the control circuitry for the unit 24 is preferably configured such that when switch 26a is actuated, if battery energy (and power) is sufficient, indicator 42 will be illuminated. However, if battery voltage is low, indicating low remaining stored energy, indicator 42 will not illuminate.

Accordingly, the controller unit 24 provides a very compact device which may be easily mounted on a handlebar, such as the handlebar assembly 12, by the owner or operator of the vehicle. The controller unit 24 may also be disassembled, when required, for replacing the battery 32 by removing the removable housing part or base member 34 after disconnecting the mounting part 38 from the remainder of the controller unit by removing the screws 40 therefrom. Major components, such as the push button switch actuator 26 and its associated pad member 29, the circuit board 30, the housing parts 28 and 34 and the mounting parts 36 and 38 may be formed of suitable plastic materials, for example. The circuit board 30 may be adapted to mount all of the components described in the aforementioned patent.

Figure 4:
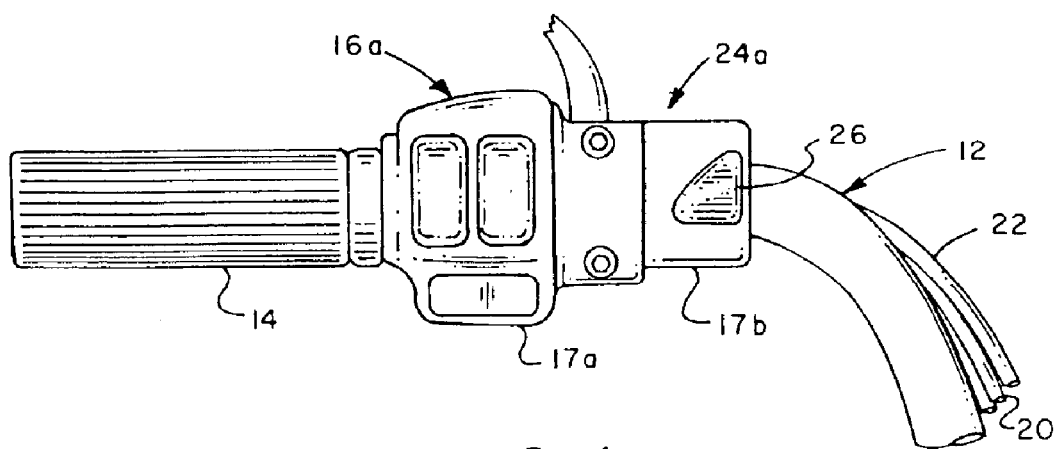
FIG. 4 is a view of a portion of a motorcycle handlebar showing a multifunction switch assembly which includes an alternate embodiment of the controller unit of the invention.

Referring now briefly to FIG. 4, there is illustrated an alternate embodiment of the invention wherein a switch assembly 16a is shown mounted on the handlebar assembly 12 in place of the switch assembly 16. Switch assembly 16a includes a housing 17a which has been modified to include a housing part 17b similar in some respects to the housing part 28 and which includes the circuitry for the aforementioned controller unit including the push button switch actuator 26, as illustrated. Accordingly, a controller unit in accordance with the invention may be provided, as indicated by numeral 24a, which is integrated with the switch assembly 16a and may use electrical power from the vehicle power source, suitably regulated as required. Those components of the controller unit 24 including the circuit board 30 and switch actuator 26 may be disposed in the housing portion 17b of the switch assembly 16a.

Those skilled in the art will recognize that other modifications and substitutions may be provided with respect to the invention disclosed herein without departing from the scope and spirit of the appended claims.

What is claimed is:

1. A remote controller unit for a garage door operator for mounting on a handlebar steered vehicle comprising:

a housing part including a push button switch actuator for actuation of said controller unit to send a radio frequency signal to a garage door operator;

a radio frequency transmitter circuit disposed in said housing part and operable to transmit a signal to said door operator in response to actuation of said switch actuator;

a first mounting part connected to said housing part for mounting said controller unit on a handlebar; and a second mounting part adapted to be releasably connected to said first mounting part for mounting said controller unit on said handlebar wherein a portion of said handlebar is disposed between said mounting parts.

2. The controller until set forth in claim 1 including:

plural fasteners engageable with said mounting parts for mounting said controller unit on said handlebar.

3. The controller unit set forth in claim 2 wherein:

said fasteners comprise screws and said fasteners include headparts engageable by a tool for connecting said mounting parts to each other by way of said fasteners.

4. The controller unit set forth in claim 1 wherein:

said mounting parts include opposed arcuate recesses for receiving said handlebars, respectively.

5. The controller unit set forth in claim 4 wherein:

one of said mounting parts includes a further recess for training one of a control cable and an electrical conductor therethrough and for supporting said one of said control cable and said electrical conductor with respect to said handlebar.

6. The controller unit set forth in claim 1 wherein:

said housing part is connected to a housing for a switch assembly for controlling selected operational features of said vehicle and mounted on said handlebar.

7. The controller unit set forth in claim 6 wherein:

said circuit receives electrical power from a vehicle electrical power system.

8. The controller unit set forth in claim 1 including:

a battery mounted in said housing part and comprising an electrical power source for said circuit.

9. The controller unit set forth in claim 8 including:

a visual indicator for indicating a low power level of said power source, said visual indicator begin illuminated when battery power is sufficient and upon actuation of said switch actuator.

10. A remote controller unit for a garage door operator for mounting on a handlebar steered vehicle comprising:

a housing part including a push button switch actuator for actuation of said controller unit to send a radio frequency signal to a garage door operator;

a radio frequency transmitter circuit disposed in said housing part and operable to transmit a signal to said door operator in response to actuation of said switch actuator;

a first mounting part connected to said housing part for mounting said controller unit on a handlebar;

a second mounting part adapted to be releasably connected to said first mounting part for mounting said controller unit on said handlebar; and said mounting parts include opposed arcuate recesses for receiving said handlebar, respectively, between said mounting parts.

11. The controller unit set forth in claim 10 wherein:

one of said mounting parts includes a further recess for training one of a control cable and an electrical conductor therethrough and for supporting said one of said control cable and said electrical conductor with respect to said handlebar.

12. The controller unit set forth in claim 10 including:

a battery mounted in said housing part and comprising an electrical power source for said circuit.

13. The controller unit set forth in claim 12 including:

a visual indicator on said housing part for indicating a low power level of said power source.

14. A remote controller unit for a garage door operator for mounting on a handlebar steered vehicle comprising:

a housing part including a push button switch actuator for actuation of said controller unit to send a radio frequency signal to a garage door operator;

a radio frequency transmitter circuit disposed in said housing part and operable to transmit a signal to said door operator in response to actuation of said switch actuator;

a first mounting part connected to said housing part for mounting said controller unit on a handlebar;

a second mounting part adapted to be operably connected to said first mounting part;

plural fasteners engageable with said mounting parts for securing said controller unit to said handlebar; and a recess formed in one of said mounting parts for training one of an electrical conductor and a control cable therethrough.

15. The controller unit set forth in claim 14 wherein:

said mounting parts include opposed arcuate recesses for receiving said handlebar, respectively.

16. The controller unit set forth in claim 14 wherein:

said housing part is connected to a housing for a switch assembly for controlling selected operational features of said vehicle and mounted on said handlebar.

17. The controller unit set forth in claim 16 wherein:

said circuit receives electrical power from an electrical power system for said vehicle.

18. The controller unit set forth in claim 14 including:

a battery mounted in said housing part and comprising an electrical power source for said circuit.

19. The controller unit set forth in claim 18 including:

a visual indicator for indicating a low power level of said power source.

* * * * *